US006408868B2

(12) United States Patent
Rondreux et al.

(10) Patent No.: US 6,408,868 B2
(45) Date of Patent: Jun. 25, 2002

(54) INTERFACE MODULE FOR AN ISLAND OF ELECTROPNEUMATIC CONTROL VALVES

(75) Inventors: Serge Rondreux, Guichainville; Grégory Lucas, Evreux; Daniel Bouteille, Viroflay, all of (FR)

(73) Assignee: Parker Hannifin RAK SA, Annemasse (FR)

( * ) Notice: Subject to any disclaimer, the term of this patent is extended or adjusted under 35 U.S.C. 154(b) by 0 days.

(21) Appl. No.: 09/835,552

(22) Filed: Apr. 17, 2001

(30) Foreign Application Priority Data

Apr. 17, 2000 (FR) .......................................... 00 04918

(51) Int. Cl.[7] .............................................. F16D 1/00
(52) U.S. Cl. .................................................... 137/270
(58) Field of Search ................................ 137/269, 270, 137/270.5

(56) References Cited

U.S. PATENT DOCUMENTS 5,775,374 A * 7/1998 Doi et al. .............. 137/625.64
5,964,244 A * 10/1999 Hiramatsu et al. .......... 137/270
5,983,921 A * 11/1999 Miyazoe et al. ............ 137/269
5,996,609 A * 12/1999 Akimoto et al. ............ 137/270

FOREIGN PATENT DOCUMENTS

| | | |
|---|---|---|
| DE | 1127675 | 4/1958 |
| EP | A1463394 | 1/1992 |
| EP | A1846872 | 6/1998 |
| EP | A2915259 | 5/1999 |

* cited by examiner

*Primary Examiner*—John Fox
(74) *Attorney, Agent, or Firm*—Birch, Stewart, Kolasch & Birch, LLP

(57) ABSTRACT

An interface module for an island of electropneumatic control valves on bases, the module comprising a body having at least one face for connection to a base of the island and, away from said base, means for coupling to at least a first external duct, said body having at least one internal main channel, a secondary channel, and a branch internal channel for connecting the main channel to the secondary channel, which branch channel is provided with a two-position selector which, depending on its position, provides continuity for the connection or interrupts it. The selector also has has connection means for connecting the secondary channel to a second external duct, which means are accessible from outside the module when the selector is in its interruption position and are masked when the selector is in its continuity position.

6 Claims, 3 Drawing Sheets

INTERFACE MODULE FOR AN ISLAND OF ELECTROPNEUMATIC CONTROL VALVES

The present invention relates to apparatus enabling a feed or an exhaust pneumatic path for a pilot circuit common to an island of electropneumatic control valves to be selected from at least one of two available paths.

BACKGROUND OF THE INVENTION

In the field of electropneumatic automation, installations have control valves for feeding actuators with air under pressure and for enabling said air under pressure coming from said actuators to be exhausted. The installation responds to commands which sequence successive switching operations of the valves in order to carry out the functions of the installation. The switching is obtained by moving a moving member internal to the control valve from one position to another. The energy required for moving the member can be purely electromagnetic or it can be pneumatic and taken from a pneumatic pilot circuit that includes a solenoid valve. The pressure that exists in the pilot circuit is generally applied sequentially to one or other of the ends of the moving member inside the control valve.

For many years, control valves of this type have been associated with respective bases each containing at least one pressure channel and at least two service orifices for connection to the actuator controlled by the control valve. Such bases enable a plurality of control valves to be grouped together as a single block (island) in which the valves are served by a common pressure channel passing through all of the bases that are grouped together.

In a manner similar to feeding an island of control valves in common, bases have more recently received at least one segment of an exhaust channel so as to provide one or two common exhaust manifolds for actuators, with said segment thus co-operating with the bases of the island to form one or two exhaust manifolds.

In that kind of architecture, internal branch channels have also been provided firstly to convey the pressure that exists in the pressure manifold of the bases to a secondary channel for feeding solenoid valves that pilot the control valves, and secondly for connecting the exhaust manifold from the control valves to a secondary channel for combining the exhausts from the solenoid valves.

However, in some cases, applying working pressure to the pilot valves is not appropriate; this pressure can be too low, for example lower than atmospheric pressure in a vacuum installation. In addition, it can be useful to be able to cut off pressure in the pilot circuit without simultaneously cutting off pressure from the installation: e.g. under circumstances where the user needs to take the function of piloting the control valves out of operation without having to act on the electrical circuits of the pilot valves. Furthermore, when it comes to collecting exhausts, it can be advantageous to separate the collection of pilot exhausts from the main manifold for collecting exhausts from the control valves, in order to avoid exhaust back pressures being generated by high flow rate actuators, which back pressures can then act on the piloting of the control valves.

As an alternative to such internal channels for feeding pressure to and for collecting exhausts from the pilot circuit, and also to rationalize the manufacture of pneumatic components, provision has been made to fit such internal channels with respective selectors whose positions define the connections of the pilot circuit as being either to the common pressure or exhaust channel, or else to a separate external duct.

In a set of control valves constructed as an island, the common pressure channel and the common exhaust channel (s) are connected to the outside of the island via at least one end module, optionally together with one or more intermediate modules, particularly if a plurality of pressure thresholds are used, thus providing an interface between the island and external pressure-feed and/or exhaust-collection ducts.

OBJECTS AND SUMMARY OF THE INVENTION

The present invention relates to the interface module fitted with at least one selector whose function is to ensure that pilot feed and/or exhaust is selectively connected either to the common pressure or exhaust channels of the bases, or else to a corresponding external duct, depending on the position of the selector. In addition, the module includes the means for connecting an external duct to the pilot channel pressure feed and/or exhaust of an island.

More precisely, the present invention provides an interface module for an island of electropneumatic control valves on bases, the module comprising a body having at least one face for connection to a base of the island and, away from said base, means for coupling to at least one first external duct. The body also having at least one internal main channel, at least one secondary channel, and a branch internal channel for connecting the main channel to the secondary channel, which branch channel is provided with a two-position selector which, depending on its position, provides continuity for the connection or interrupts it.

According to the invention, the selector has connection means for connecting the secondary channel to a second external duct, which means are accessible from outside the module when the selector is in its interruption position and are masked when the selector is in its continuity position.

These connection means can be of any conventional type, such as a quick coupling endpiece or an externally or internally threaded orifice, such that they constitute a display member for any person taking action, which member, when visible, indicates that the solenoid pilot circuit of the island in communication with the secondary channel of the body needs to be connected to an external duct, regardless of whether the external duct is a feed duct or an exhaust collector duct (or more simply, for the exhaust, to an exhaust silencer leading to the surrounding air and connectable via the same means), whereas if said coupling member is not visible, then pressure feed or exhaust collection for the solenoid valve pilot circuit of the island is provided internally.

In an advantageous embodiment, the selector overlies the above-mentioned body, co-operating therewith via a face that is perpendicular to its face for connection to the bases, and it is covered by a cap for masking the connection means for connecting the selector to said second external duct when the selector is in its continuity position.

When it is used for pilot pressure, the main module channel concerned by the selector is a pressure channel, and the secondary channel is a channel for feeding the pilot circuit.

The selection function can also apply to exhaust from the pilot circuit depending on whether or not it is desired for the exhaust to join the exhaust manifold provided in the bases, which depends on the exhaust back pressures that might exist in the exhaust manifold. Under such circumstances, the above-mentioned module main channel is an exhaust channel and the secondary channel concerned by the selector is a common channel for collecting pilot exhaust or an exhaust silencer leading to the surrounding air.

An island of control valves on bases can lie between two interface modules located at respective ends of the island. One of the modules can be concerned only with connecting the island to the working pressure source and optionally to an auxiliary pressure source for pilot purposes, while the other module can be concerned only with providing common collection of exhaust from the control valves and optionally with collecting pilot exhaust. However, in preferred manner, an island has only one end module which serves both to connect the island to the working pressure source and optionally (depending on the position of the selector) to the auxiliary source for feeding the pilot circuit, and also for collecting exhaust from the actuators and optionally exhaust from the pilot valves. Under such circumstances, the module includes two superposed selectors, one for the pressure circuit and the other for the exhaust circuit.

Mention is also made of the optional existence of intermediate modules located between two base blocks which, for example, serve to isolate one block from the other so that the blocks can be fed with different pressures, with the intermediate blocks nevertheless being transparent so far as exhaust is concerned. Such intermediate blocks can be fitted with selectors of the invention.

Finally, according to a secondary characteristic of the invention, in order to satisfy certain ergonomic and appearance criteria, the connection means carried by the selector, when accessible, are situated on the same face of the module as carries the means for connection to the first external ducts, i.e. the ducts for feeding working pressure and the ducts for collecting exhaust.

BRIEF DESCRIPTION OF THE DRAWINGS

Characteristics and advantages of the invention appear from the following description of a preferred embodiment of the invention.

Reference is made to the accompanying drawings, in which.

MORE DETAILED DESCRIPTION

Figure 1:
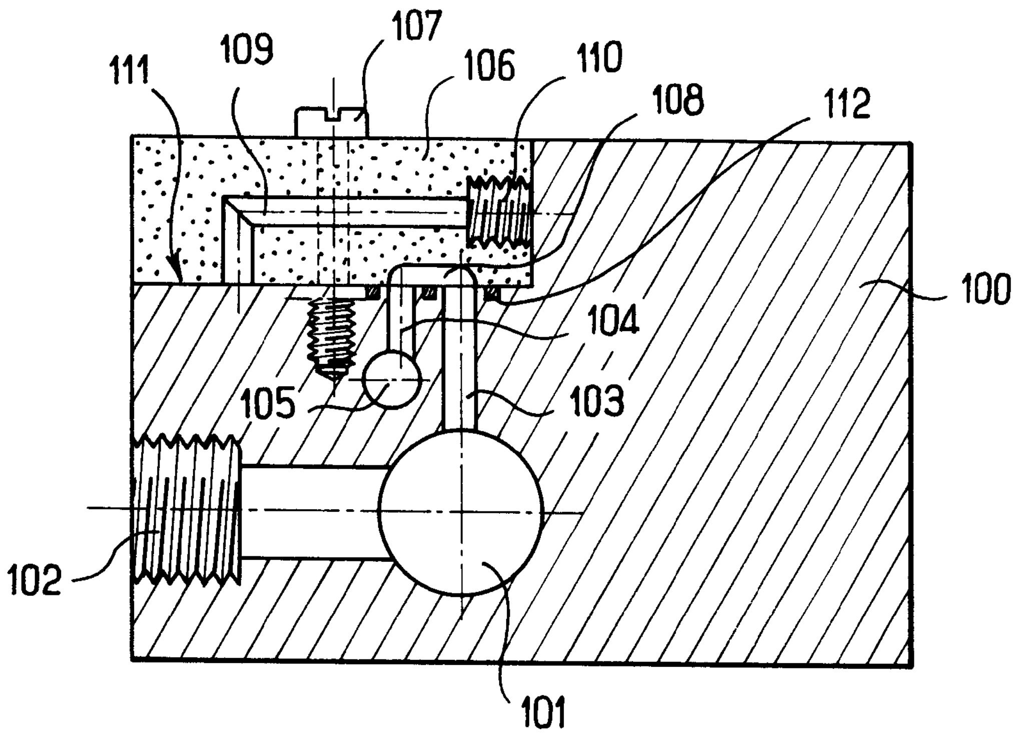
FIGS. 1 and 2 are two diagrammatic views of a module of the invention shown in section on a plane parallel to its plane for association with an island.
Figure 2:
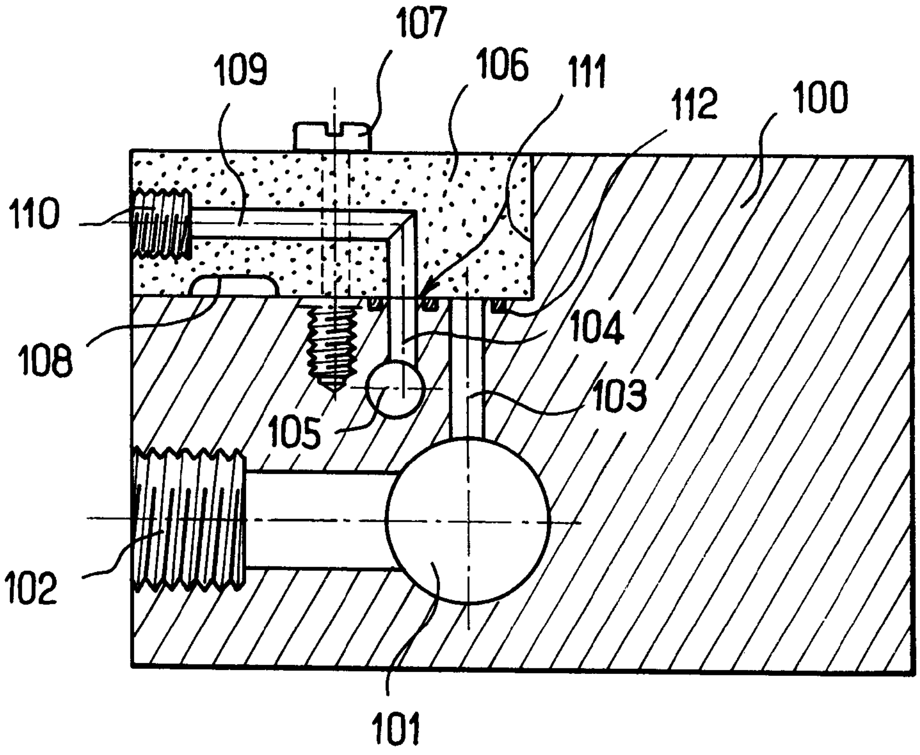

FIGS. 1 and 2 are section views showing a generally rectangular body 100 intended, for example, to be associated via one of its faces parallel to the section plane to one of the bases of an island of control valves (not shown). The body is provided with an internal main channel 101 which can be the root either of a feed manifold or of an exhaust manifold of the bases in the island. This channel 101 is connectable by means 102 either to a duct coming from a source of fluid under pressure, or to a duct for collecting exhaust (or to an exhaust silencer).

It also has two segments 103 and 104 of an internal channel that branches from the main channel 101, this branch channel terminating at a secondary channel 105 which is the root either of a common feed duct for the pilot valves of the control valves of the island, or of a common exhaust collector duct for the pilot valves.

In association with the body 100, the module has a selector 106 suitable for being fixed to the body 100 in two different positions by means of a screw 107. This selector 106 possesses internal channels 108 and 109 that are separate from each other.

In a first position of the selector 106 (FIG. 1), the channel 108 provides flow continuity between the segments 103 and 104, and thus provides communication between the channel 101 and the channel 105. In this position, the channel 109 is not in service.

In the second position of the selector 106, which in the example shown in the figures is a result of the selector 106 being turned the opposite way round, the channel 108 is out of service while the channel 109 provides a connection between a segment 104 and connection means 110 enabling the channel 109 to be connected to an external duct (or to an exhaust silencer).

It will be observed that in this case, the selector is received in a housing in the body 100 which is such that in the first position (FIG. 1) of the selector 106, the means 110 are masked by the body 1 while in the second position of the selector 106, the connection means 110 are uncovered, visible from outside the module, and accessible for making a connection. Advantageously, access to these means is provided on the same side (same face) as access to the means 102. At the interface between the body 100 and the selector 106, gaskets 112 provide sealing either for the continuity of the branch channel 103, 108, 104 (FIG. 1), or for the connection between the segment 104 and the channel 109 and isolation of the segment 103 (FIG. 2).

It will be understood that when the selector is in the position shown in FIG. 1, the channel 105 is connected to the channel 101 via the branch duct and no connection means 110 can be seen outside the module, thereby preventing any useless or erroneous connection being made. When the selector is in the FIG. 2 position, the channel 105 is isolated from the channel 101 and the connection means 110 can be seen from outside the module, thereby strongly urging a person taking action the installation to make the necessary connections thereto. These connection means 110 carried by the selector thus constitute a highly effective display element for any person taking action on the installation, thus providing that person with a simple manner of checking whether the connections that have been made are correct or incorrect.

The following figures show details of a preferred embodiment of the module which is shown diagrammatically in the above figures.

Figure 3:
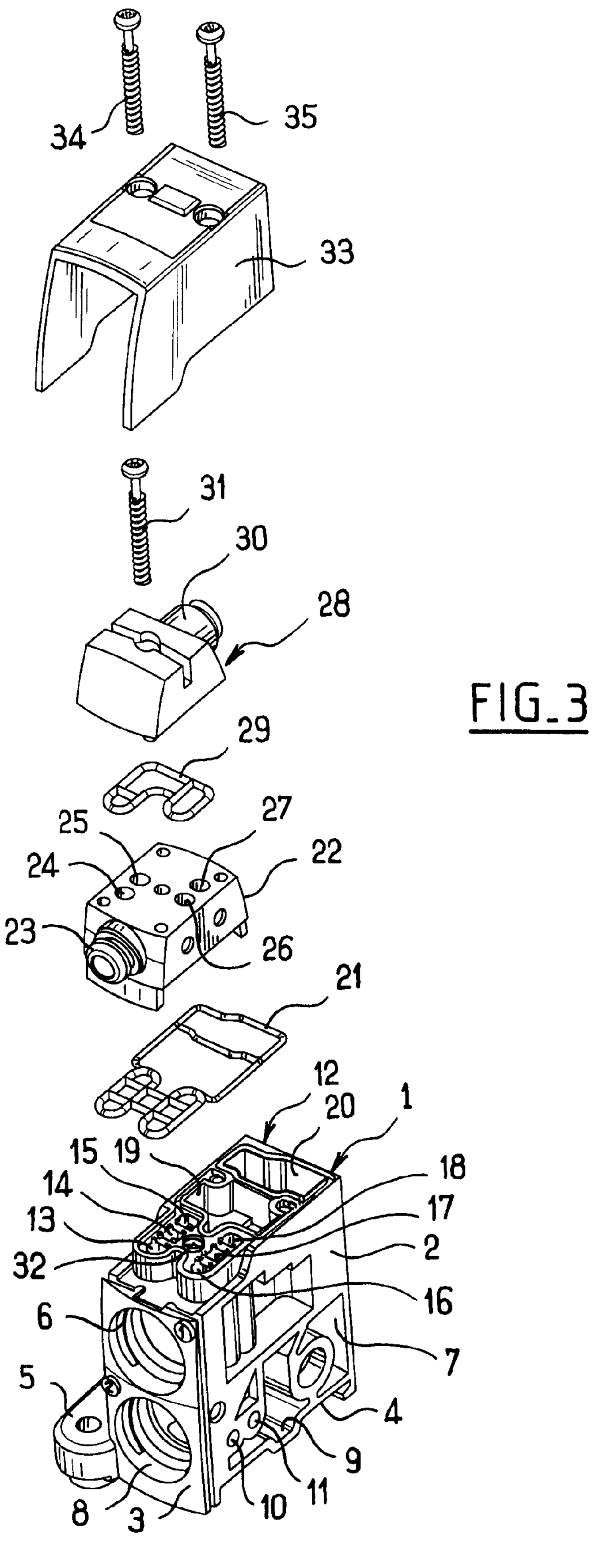
FIG. 3 is an exploded perspective view of a module of the invention for providing an interface between an island of control valves on bases and external ducts both for pressure feed and for exhaust purposes, and provided with selectors, one being associated with pilot pressure and the other with pilot exhaust.

The body 1 of the interface module shown in FIG. 3 is a member made out of injected plastics material, and it is generally in the form of a rectangular parellelepiped having a face 2 for connection with a base in an island of electrically controlled control valves, a front face 3, a bottom face 4 for co-operation with a support (not shown), and a tab 5 for receiving means for fixing the module to said support.

The body 1 is provided with numerous internal channels, including a first channel that provides the connection between a connection orifice 6 in the front face 3 and a connection orifice 7 in the face 2 for conveying gas under pressure. A second channel provides a connection inside the body between the front face orifice 8 and an orifice 9 in the face 2 that leads to the exhaust manifold of the island. The face 2 also has two other orifices 10 and 11 which are the ends of internal ducts corresponding in the adjacent island respectively to the pressure manifold and to the exhaust collection manifold for the pilot valves.

Opposite from its face 4, the body 1 has a top face 12 into which various ducts open out via various orifices. Thus, the orifice 13 is the end of a duct which is in communication with the orifice 6 and thus with the orifice 7. The orifices 14 and 15 are the ends of two blind ducts. The orifice 16 is the end of a duct which communicates with the orifice 10. The orifice 17 is the end of a duct which communicates with the orifice 11, and the orifice 18 is the end of a duct which communicates with the orifice 9.

The orifices 19 and 20 correspond respectively to the end of a non-functional recess and to a cavity in communication with the orifice 7.

A gasket 21 constitutes a sealing element for isolating each of the above-mentioned orifices from one another.

A selector 22 is constituted by a body made of plastics material and is suitable for being fitted on the body 1 so as to overlie the orifices 13 to 18. This selector has connection means 23 which project from one of its faces to enable it to be connected to an external pressure duct. These connection means are represented here in the form of a quick connection endpiece, but the invention covers any other connection means (threaded endpiece, tapped orifice, as shown in FIGS. 1 and 2). The selector 22 has internal ducts, four of which 24, 25, 26, and 27 are through ducts. These internal ducts have no function relating to the function of the selector 22. In the position shown, the ducts 24, 2S, 26, and 27 correspond respectively with the orifices 13, 14, 17, and 18. The selector 22 can be turned through 180° so as to overlie part of the body 1, and in this case the ducts 27 and 26 are respectively in register with the orifices 13 and 14 while the ducts 25 and 24 are respectively in register with the orifices 17 and 18.

The selector 22 also has other internal ducts, including one which connects the connection means 23 to the orifice 16 and another which forms a bridge between the orifices 16 and 18, when in the position shown in the figure. When the selector is in its other position, the first internal duct connects the means 23 to the blind orifice 15 and the second internal duct forms a bridge between the orifices 13 and 16.

A second selector 28 overlies the selector 22 via a gasket 29. This selector 28 has connection means 30 for connection to an external duct. Like the selector 22, this selector 28 can be installed in two different positions: in the position shown in which the connection means 30 face in the opposite direction to the connection means 23, and in a position in which the connection means 30 are on the same side as the connection means 23 of the selector 22.

The selector 28 also has internal ducts including one (not shown) that forms a bridge between the ducts 26 and 27 or

24 and 25 depending on the position of the selector 28 relative to the selector 22, and another of which connects the connection means 30 either to the duct 25 or to the duct 26, likewise depending on the relative position of the two selectors 28 and 22.

A screw 31 passes through both selectors so as to be received in a tapped orifice 32 in the body 1 in order to clamp the stack built up in this way. A cap 32 is fitted onto the body 1 by two screws 34 and 35 so as to leave visible that face of the selectors which corresponds to the front face 3 of the body 1 of the interface module while masking the other faces of the selectors and constituting a wall for closing the orifice 20 in sealed manner.

In FIGS. 4 to 7, some of the elements described above can be seen again, and they are given the same references.

Figure 4:
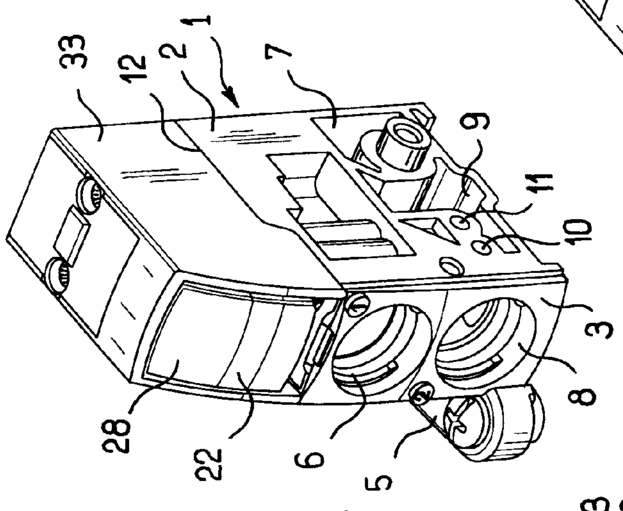
FIG. 4 is an external perspective view of the FIG. 3 module when assembled, the selectors being in their positions for providing communication inside the module between the working and pilot pressure circuits and between the working and pilot exhaust-collection circuits.

In FIG. 4, it can be seen that the selectors are stacked in such a manner that their external connection means 23 and 30 are turned away from the front face 3 and are masked by the cap 33. In this position, the orifice 13 communicates with the orifice 16, i.e. the orifice 10 communicates with the working pressure admitted by the orifice 6 into the module of the invention. The relative position of the selectors and of the module body is such as to establish communication between the orifice 11 and the orifice 9 for the channel that collects exhaust from the solenoid valves of the pilot circuit. In this type of arrangement, communication therefore exists both between the working pressure and the pilot pressure, and also between the exhaust collected from the control valves and the exhaust collected from the pilot valves.

Figure 5:
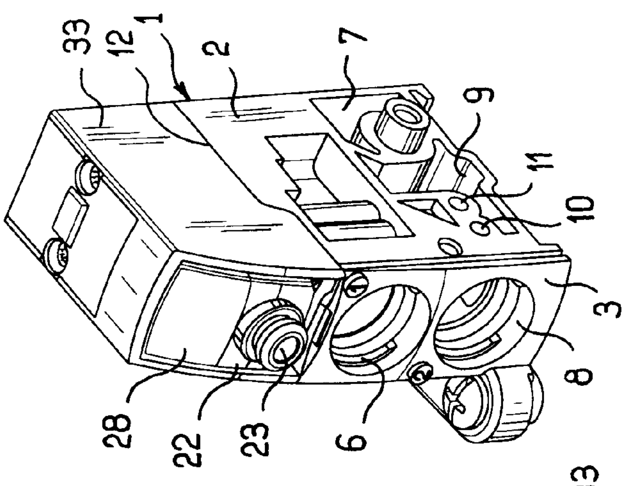
FIG. 5 is a view similar to FIG. 4 showing the module of the invention with the selector isolating the pressure manifold of the pilot circuit and allowing it to be fed with pressure from an external source.

In FIG. 5, there is no change for the exhaust collected from the control valves and the solenoid valves. However, the selector 22 is in its position opposite from that shown in FIG. 4 and thus has its connection means 23 visible in the front face 3 of the module. In this disposition, the connection means 23 are connected via the orifice 16 to the orifice 10 so that the pressure manifold in the pilot circuit is separate from the pressure manifold for the control valves. This arrangement is advantageous since it makes possible firstly to feed the pilot circuit with a fluid at a pressure that is different from the pressure of the fluid controlled by the control valves, which is absolutely essential if the control valves are working with a vacuum, and secondly it provides a display for an installer or a user of the devices indicating that it is necessary to feed the pilot circuit in separate manner. It will also be understood that merely by disconnecting this separate feed, the entire control means for the control valves is taken out of operation, i.e. the pilot circuit is taken out of operation, thereby making it possible to take action on the pneumatic equipment without needing to take the electrical circuits of the solenoid valves out of operation.

Figure 6:
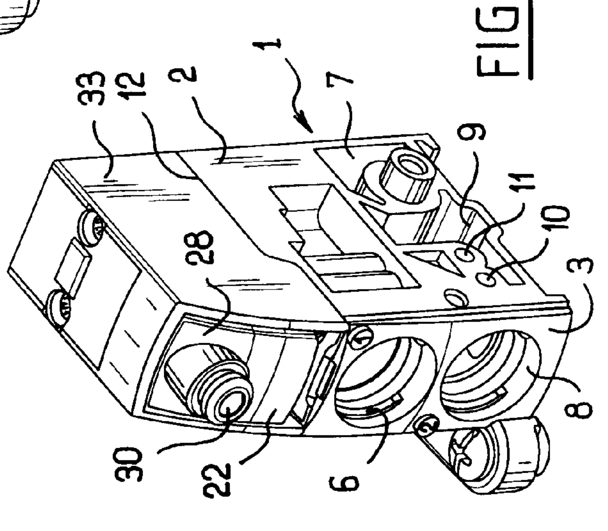
FIG. 6 is a view identical to the two preceding views showing a module of the invention in which internal communication is provided between the working pressure manifold and the feed to the pilot circuit while the pilot exhaust is collected separately from the control valve exhaust.

In FIG. 6, the pressure connection of the module provided by the selectors is identical to that described with reference to FIG. 4, while the exhaust connection is such that the connection means 30 are visible in the front face 3 which is a sign that the exhaust from the pilot circuit is collected independently from the exhaust manifold for the control valves. The connection means 30 are connected to the duct 25 which is itself in register with the orifice 17 and thus the orifice 11 where the pilot circuit exhaust manifold terminates. The advantage of isolating the exhaust from the pilot valves relative to the exhaust from the control valves lies in eliminating the harmful effects of the back pressure that can exist in the exhaust manifold connected to the control valves on the states of the pilot valves, which effects can lead to the solenoid valves functioning wrongly.

Figure 7:
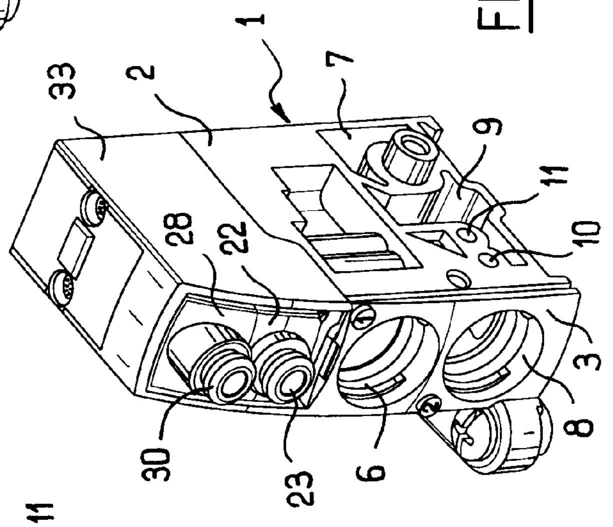
FIG. 7 is a view similar to the three preceding figures in which the selectors are positioned so that the pressure feed and the exhaust for the pilot circuit are completely separated from the pressure feed and the exhaust collection for the actuators.

Finally, FIG. 7 shows the fourth possible state for the interface module of the invention. Both selectors 22 and 28 have their connection means 23 or 30 visible, thus indicating that pressure admission and exhaust collection for the pilot circuit are independent of working pressure admission and exhaust collection for the control valves. With the selectors in this configuration, the orifice 10 communicates with the connection means 23 while the orifice 11 communicates with the connection means 30, the internal ducts also being isolated from the orifices 6 and 8.

Starting from the device as described, it is easy to devise simpler modules without going beyond the ambit of the invention. For example, a module of the invention need relate to pressure feed only, having only the orifices 6 & 7 and the orifices 10, 13 & 16, together with a single selector such as 22 without any passages 24 to 27, and a cap 33 that is not so tall. Similarly, a different module could relate to exhaust only, having orifices 8, 9, 11, 17, and 18, a selector such as 28, and a shorter cap 33. Such modules could be placed at opposite ends of an island of control valves on respective bases.

What is claimed is:

1. An interface module for an island of electropneumatic control valves on bases, the module comprising a body having at least one face for connection to a base of the island and, away from said base, means for coupling to at least a first external duct, said body having at least one internal main channel, a secondary channel, and a branch internal channel for connecting the main channel to the secondary channel, which branch channel is provided with a two-position selector which, depending on its position, provides continuity for the connection or interrupts it, wherein the selector has connection means for connecting the secondary channel to a second external duct, which means are accessible from outside the module when the selector is in its interruption position and are masked when the selector is in its continuity position.

2. A module according to claim 1, wherein the selector overlies the above-mentioned body, co-operating therewith via a face that is perpendicular to its face for connection to the bases, and wherein the selector is covered by a cap for masking the connection means for connecting the selector to said second external duct when the selector is in its continuity position.

3. A module according to claim 1, wherein the main channel is a pressure channel and wherein the secondary channel is a common pilot pressure channel.

4. A module according to claim 1, wherein the main channel is an exhaust channel and wherein the secondary channel is a common pilot exhaust-collection channel.

5. A module according to claim 1, the module having two selectors that are superposed, one being associated with pressure channels and the other with exhaust channels.

6. A module according to claim 1, wherein the connection means carried by the selector, when accessible, are situated in the front face of the module which carries the connection means for the first external duct.

* * * * *